United States Patent [19]

Segawa et al.

[11] 4,147,244
[45] Apr. 3, 1979

[54] MULTI-SPEED TRANSMISSION HUB

[75] Inventors: Takashi Segawa; Seiji Fukui, both of Sakai, Japan

[73] Assignee: Shimano Industrial Company Limited, Osaka, Japan

[21] Appl. No.: 852,346

[22] Filed: Nov. 17, 1977

[30] Foreign Application Priority Data

Nov. 27, 1976 [JP] Japan .................................. 51/142779
Nov. 27, 1976 [JP] Japan .................................. 51/142780

[51] Int. Cl.² .......................... F16H 3/44; F16D 67/00
[52] U.S. Cl. .................................... 192/6 A; 74/750 B
[58] Field of Search .......... 192/6 A; 74/750 B, 781 B

[56] References Cited

U.S. PATENT DOCUMENTS

| 3,122,226 | 2/1964 | Schuller et al. | 192/6 A |
| 3,366,206 | 1/1968 | Shimano | 74/750 B X |
| 3,608,683 | 9/1971 | Fujisawa | 192/6 A |
| 3,670,856 | 6/1972 | Segawa | 74/750 B X |
| 3,828,627 | 8/1974 | Schwerdhofer | 192/6 A X |
| 3,973,451 | 8/1976 | Kine | 192/6 A X |

Primary Examiner—Lance W. Chandler
Attorney, Agent, or Firm—Stevens, Davis, Miller & Mosher

[57] ABSTRACT

A multi-speed transmission hub for a bicycle having a multi-speed change mechanism and a braking mechanism for braking action by back-pedaling, in which first transmitting members of pawl shape serve to transmit the driving force from the speed-change mechanism to a hub shell and are urged by a pawl spring in the direction of being disengaged from first inner teeth of the hub shell, while, the transmitting members are adapted to be engaged with the first inner teeth by use of differential rotary speed between a gear frame and ring gear of the speed-change mechanism, when a driving member is normally rotated.

5 Claims, 4 Drawing Figures

MULTI-SPEED TRANSMISSION HUB

This invention relates to a multi-speed transmission hub with a coaster brake.

Generally, this kind of hub comprises a shaft fixed to the bicycle frame, a driving member supported with respect to a hub shell and the fixed shaft in relation of being normally and reversely rotatable therewith respectively, a speed-change mechanism for transmitting the driving force from the driving member to the hub shell, and a braking mechanism for braking the hub shell by reverse rotation of the driving member. The hub is so constituted that the driving member is normally rotated by pedaling through a driving chain so that the driving force in a given speed-change ratio is transmitted from the driving member to the hub shell through the speed-change mechanism to thereby drive the hub shell, while, the driving member is reversely rotated by back-pedaling to actuate the braking mechanism thereby braking the rotation of the hub shell.

The speed-change mechanism includes a sun gear provided on the fixed shaft, planetary gears in mesh with the sun gear, a gear frame carrying the planetary gears, and a ring gear having inner teeth in mesh with the planetary gears, so that the driving force from the driving member may be relayed to either the gear frame or ring gear and transmitted to the hub shell through transmitting pawls in mesh with ratchet teeth provided at the inner surface of the hub shell. Hence, when the driving member is reversely rotated to actuate the braking mechanism to stop the hub shell, the transmitting pawls are fixed in mesh with the ratchet teeth, so that a cyclist cannot rotate the driving member after completion of the braking action even though he tries to do so by pedaling. Thus there is the problem in that the driving member is not rotatable either normally or reversely due to unreleased brake effect of the braking mechanism. This occurrence is known as the so-called locking phenomenon.

In other words, the transmitting pawls, which are free from the ratchet teeth when the driving member is reversely rotated, are in mesh with the ratchet teeth when the rotation of the hub shell is stopped by the reverse rotation. Under the conditions, when the driving member is tried to be normally rotated, the braking mechanism acts to restrain the gear frame in connection therewith from being rotatable, thereby making it impossible to rotate the driving member and release the braking action of the braking mechanism.

The locking phenomenon occurs also when the bicycle is moved backwardly to actuate the braking mechanism by reversely rotating the gear frame through the active transmitting pawls.

One of the conventional methods proposed for dissolving the aforesaid problem is a control ring system in which a control ring for the transmitting pawls is provided to be in frictional contact with the hub shell so that the pawls fall down from the control ring to disengage from the ratchet teeth when braking the hub shell by reverse rotation of the driving member. The other is a ratchet idling system in which the ratchet teeth separated from the hub shell are made idle with respect to the hub shell only in a fixed angle, so that the transmitting pawls and ratchet teeth are integrally rotated when starting normal rotation of the driving member after completion of the braking action to the hub shell, thereby releasing the braking action of the braking mechanism through integral rotation.

However, the control ring system has the problem that the hub requires an extra control ring in addition to the components of the speed-change mechanism and is complicated in assembly with more parts to be built in a narrow space in the hub shell. The control ring in frictional contact with the hub shell is inconsistent in its function. Also, the locking phenomenon still occurs when the bicycle is moved backwardly to actuate the braking mechanism. The latter ratchet idling system is defective in that a particular ratchet member should be separated from the hub shell and incorporated into the hub shell, thereby being complicated in construction and troublesome in assembly.

It is therefore the main object of the invention to provide a multi-speed transmission hub with a coaster brake which is simple in construction and capable of ensuring elimination of the locking phenomenon during the braking action. Another object is to provide a multi-speed transmission hub with a coaster brake which will not lock when moving the bicycle backwardly.

The invention is characterized in that first transmitting pawls, which are adapted to mesh with the first inner teeth provided at the inner periphery of the hub shell so that the driving force may be transmitted from the driving member to the hub shell, are urged by a pawl spring in the direction of disengagement from the first inner teeth and, when the driving member is normally rotated, are meshed therewith by use of differential rotary speed between the gear frame having planetary gears and the ring gear having inner teeth in mesh with the planetary gears.

The invention is characterized further in that a clutch ring always engageable with the second inner teeth provided at the inner surface of the hub shell is formed independently of the gear frame. The clutch ring is provided with a tapered face engageable with a counter-tapered face of a clutch cone. Between the clutch ring and the gear frame is provided a clutch means which transmits reverse rotation of the clutch ring to the gear frame when the hub shell is reversely rotated, and is slidable when applied with the resistance over the predetermined value. Thus when the bicycle is moved backwardly, the ring gear including inner teeth in mesh with the planetary gears and having the first transmitting pawls in mesh with the first inner teeth of the hub shell, is rotated at high speed by the reverse rotation of hub shell, thereby disengaging the first transmitting pawls from the first inner teeth.

These and other objects and features of the invention will become more apparent upon a reading of the following detailed specification and drawings, in which.

Figure 1:
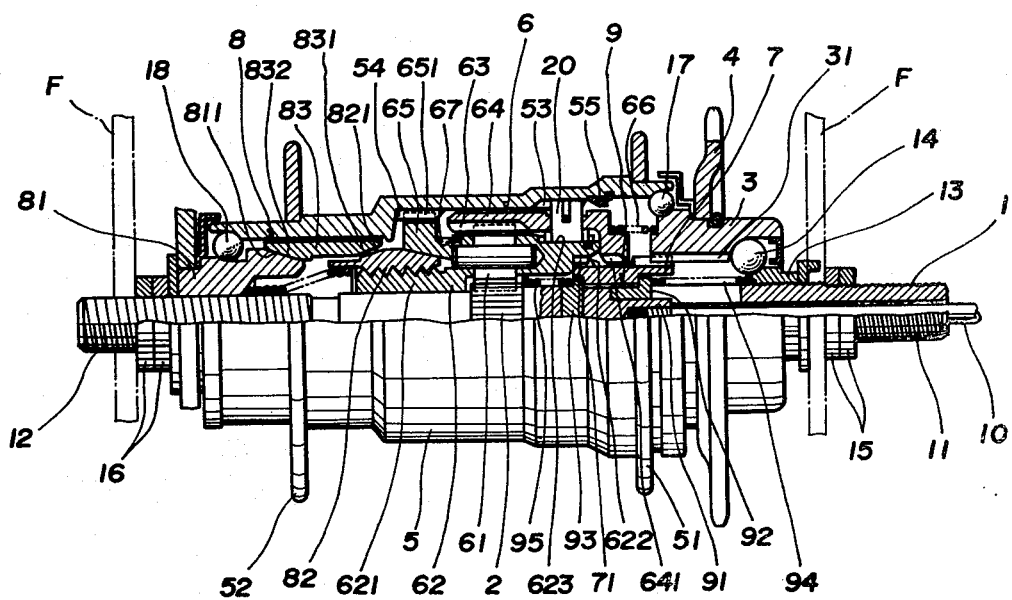
FIG. 1 is a partially cutaway rear view of an embodiment of the invention.

Referring to the drawings, a three-speed transmission hub is capable of changing the speed into a high, middle and low speed state. The hub generally comprises a fixed shaft 1 fixed to the bicycle frame F and having a sun gear 2 at the outer periphery of a substantially intermediate portion, a driving member 3 rotatably supported to the fixed shaft 1 and having a sprocket 4 at the outer periphery, a hub shell 5 rotatably supported with respect to the driving member 3, a speed-change mechanism 6 housed within the hub shell 5 to change the speed of driving force being transmitted from the driving member 3 to the hub shell 5, a control member 7 for relaying the driving force from the driving member 3 into the speed-change mechanism 6, and a braking mechanism 8 acting when the driving member 3 is reversely rotated to stop the rotation of hub shell 5.

In greater detail, the fixed shaft 1 is provided at its axial ends with screw threads 11 and 12. Screw thread 11 (at the right side in the drawings) has screwed to it a ball holder, which rotatably carries the driving member 3 through balls 14, and a lock nut 15 which secures one end of the fixed shaft 1 to the bicycle frame F. Screw thread 12 (at the left side in the drawings) has screwed to it a brake cone 81 forming a portion of the braking mechanism 8, and a lock nut 16 which secures the other end of the fixed shaft 1 together with the brake cone 81 to the bicycle frame F.

The driving member 3 is provided at its inner periphery with a ball race for balls 14 and with spline 31 of a given length extending axially thereof and at its outer periphery with a ball race for balls 17 which carry one axial end of the hub shell 5. The outer periphery of the brake cone 81 provides a ball race for balls 18 for supporting the other axial end of the hub shell 5. Thus the hub shell 5 is rotatably supported through the balls 17 and 18, borne by the ball races.

The hub shell 5 has on its outer periphery at each end flanges 51 and 52 and on its inner periphery the first inner teeth 53 of a ratchet type in mesh with the first high and middle speed transmitting members to be hereinafter described and the second inner teeth 54 always in mesh with second low speed transmitting members to be hereinafter described.

The speed-change mechanism 6 housed within the hub shell comprises a gear frame 62 carrying planetary gears 61 in mesh with the sun gear 2, a ring gear 64 having inner teeth 63 in mesh with the planetary gears 61 and carrying the first high and middle transmitting members 20 of pawls (hereinafter called transmitting pawls for the convenience of explanation), and a clutch ring 65 constituting the second transmitting members. The gear frame 62 is provided at its one axial end toward the braking mechanism with a tubular extension 621. On the outer periphery of the extension is provided a rough screw thread to be screwed with a clutch cone 82 of the braking mechanism 8. Also, the gear frame 62 is provided on its inner periphery at the other axial end thereof with teeth 622 engageable with end portions 71 of the control member 7 and at the outer periphery with an annular stepped portion 623 receiving therewith a control mechanism for controlling the first transmitting pawls 20.

The ring gear 64 is axially movable and urged always away from the driving member 3 by means of a spring 66 inserted between ring gear 64 and the driving member 3. The ring gear 64 also has on its inner periphery at the end directed toward the driving member 3, inner teeth 641 engageable with the end portions 71 of the control member 7 and stepped portions 642 which are formed on a side of each of the engaging inner teeth 641 and which are engageable with the end faces of the engaging end portions 71. Ring gear 64 has on its outer periphery corresponding to the stepped portion 623 of the gear frame 62, an annular groove 643 (FIG. 3) circumferentially formed to receive a pawl spring 21 therein and two through holes 644 spaced from each other by 180° angle of the circumference along the groove 643 so as to receive the first transmitting pawls 20 therein. The transmitting pawls 20 are inserted into the through holes 644 and are urged by the pawl spring 21 of a ring-like shape stretched on the outer surfaces of the pawls 20, to abut their inner surfaces against the stepped portion 623. Thus the pawls 20 are kept on their tips to be free from the first inner teeth 53.

The aforesaid control mechanism serves to raise the first transmitting pawls 20 to mesh at their tips with the first inner teeth 53 when the driving member 3 is normally rotated. The control mechanism comprises a cylindrical casing 22 and rollers 23. The casing 22 is sleeved onto the stepped portion 623 of the gear frame 62, has at the widthwise intermediate portions as many windows 221 as there are first transmitting pawls 20, and is retained with a bent end of a clutch spring 24 wound within and along an annular groove 623a formed at the stepped portion 623. The clutch spring 24 applies the resistance over the prescribed value to the casing 22 against its rotation in the direction of the arrow X in FIG. 3, the resistance overcoming the strength necessary for raising the first transmitting pawls 20 against the pawl spring 21. As a result, the casing 22 is rotated together with the ring gear 64 with respect to the gear frame 62 through the first transmitting pawls 20 and rollers 23 when the driving member 3 is normally rotated.

The rollers 23 are supported in the windows 221. The first transmitting pawls 20 carried by the ring gear 64 are abutted against the rollers 23 and raised at the tips to be in mesh with the first inner teeth 53 because the ring gear 64 is rotatable faster than the gear frame 62 when the driving member 3 is normally rotated. Also, the ring gear 64 is reversely rotatable faster than the gear frame 62, similarly to the above normal rotation, when the driving member 3 is reversely rotated. Thus the first transmitting pawls 20 carried with the ring gear 64 become slidable within the windows 221 and are moved relatively to the casing 22 to result in leaving the rollers 23 falling down by means of the pawls spring 21, thereby to disconnect themselves from the first inner teeth 53.

The control mechanism as aforesaid is an important portion of the invention is well as the direction of urging the pawl spring 21 against the first transmitting pawls 20. The control mechanism is designed to allow the first transmitting pawls 20 to be meshed with the first inner teeth 53 by use of the difference in relative rotary speed between the gear frame 62 and gear ring 64, but is not limited to the aforesaid construction.

The clutch ring 65 constituting the second transmitting member is separated from the gear frame 62. At the outer periphery of the clutch ring 65 are provided teeth 651 always in mesh with the inner teeth 54 on the hub shell 5 and at the inner periphery is provided a tapered face 652 in contact with a counter-tapered face 822 formed on the clutch cone 82. In addition, the clutch ring 65 is provided on its outer periphery toward the gear frame 62 with a clutch spring 67 wound to constitute the clutch means. The clutch spring 67 is bent at its one end to be retained with the gear frame 62 when the hub shell 5 is reversely rotated. When the bicycle is moved backwardly to reversely rotate the clutch ring 65 meshed with the inner teeth 54 of the hub shell 5, the spring 67 is radially contracted so as to transmit the reverse rotation of the clutch ring 65 to the gear frame 62.

The clutch ring 65 serves to prevent the braking mechanism 8 from acting when moving the bicycle backwardly, which may be replaced by low speed transmitting pawls provided at the gear frame 62 as is well known. In this instance, the low speed transmitting pawls are made to free from the second inner teeth similarly to the first transmitting pawls 20 and rise to mesh with the second inner teeth by use of the differential rotary speed between the ring gear 64 and gear frame 62.

The braking mechanism 8 comprises, as is well known, the brake cone 81, clutch cone 82 and brake shoes 83. The outer peripheries of the brake cone 81 and clutch cone 82 have tapered faces 811 and 821, engageable with tapered faces 831 and 832 on the inner peripheries of the brake shoes 83 respectively.

Figure 2:
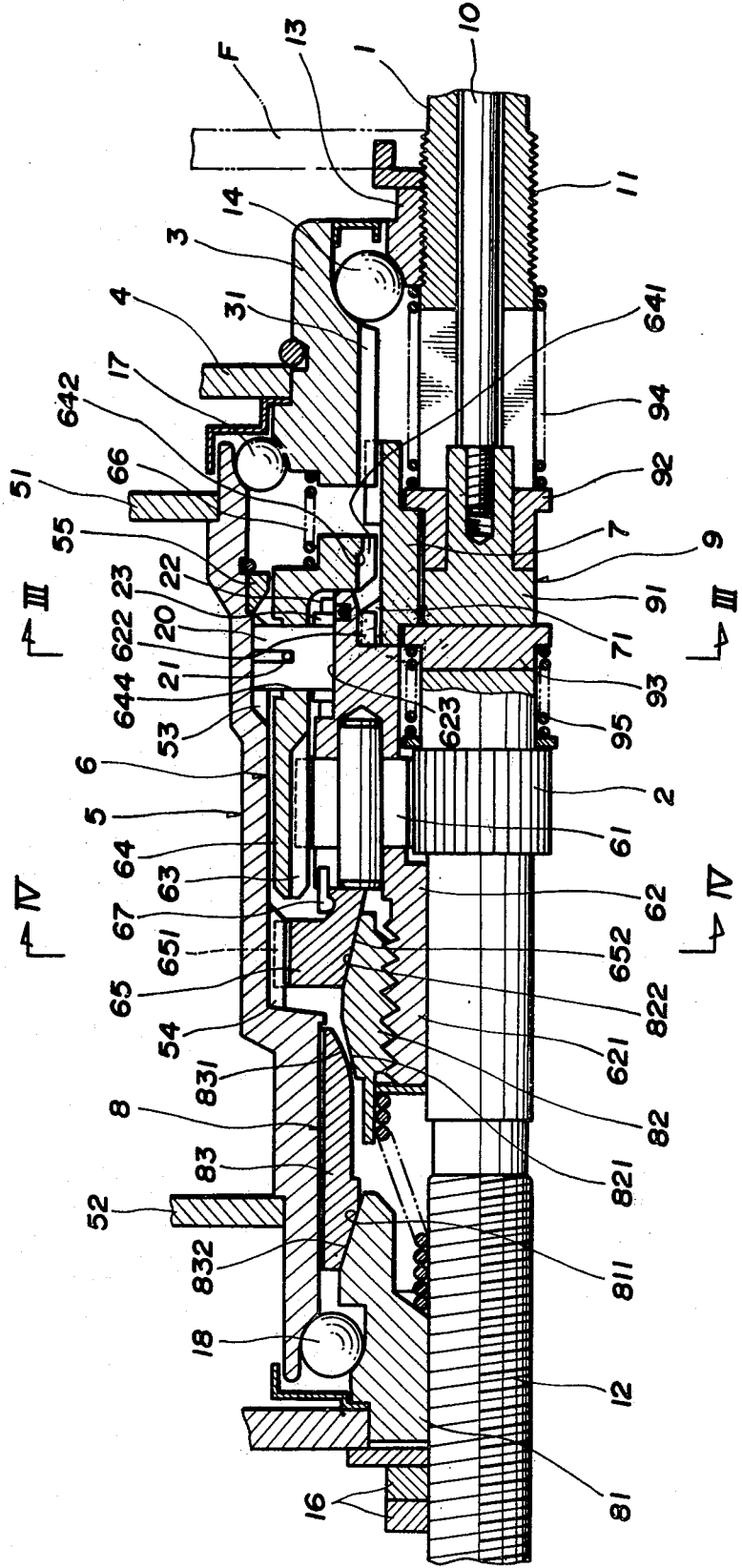
FIG. 2 is an enlarged cutaway portion thereof.

In FIGS. 1 and 2, the reference numeral 9 designates a speed-change key for moving the control member 7. The key body 91 is connected to a rod 10 reciprocating within a center hollow and has at both ends sub-keys 92 and 93 biased by springs 94 and 95 respectively. When the rod 10 is moved rightwardly in FIGS. 1 and 2, the spring 94 is compressed and the spring 95 pushes the subkey 93 so as to move the control member 7 rightwardly.

The reference numeral 55 designates a pawl-control ring attached to the inner surface of the hub shell 5 by means of a snap-ring. The pawl-control ring 55 prevents the first transmitting pawls 20 from rising when the control member 7 moves rightward to move the ring gear 64 rightwardly in FIGS. 1 and 2, to drive the hub at low speed.

The function of the multi-speed transmission hub is detailed in the following description.

The hub shown in FIGS. 1 and 2 is in high speed driven condition, in which the engaging end portions 71 of the control member 7 are engaged with the teeth 622 of the gear frame 62.

Hence, the driving force from the driving member 3 is relayed to the gear frame 62 through the control member 7 and accelerated through the planetary gears 61 to be transmitted to the hub shell 5 through the inner teeth 63, the ring gear 64 and the first high and middle speed transmitting pawls 20.

Figure 3:
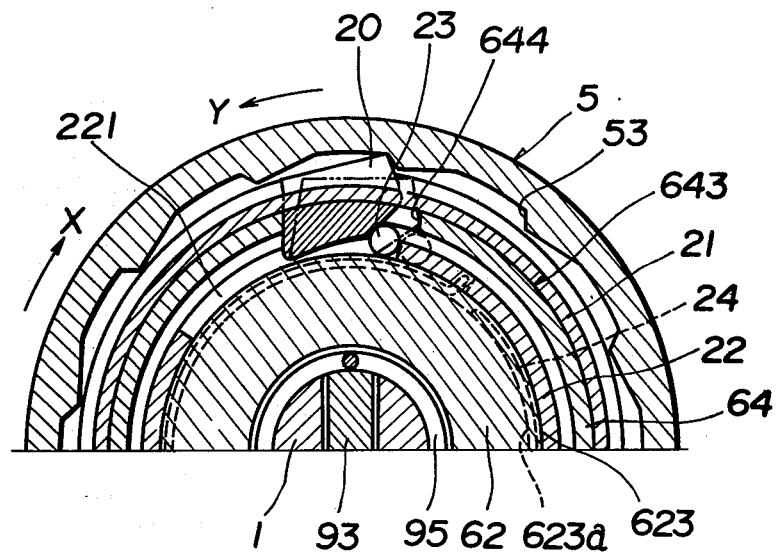
FIG. 3 is a sectional view taken on Line III—III in FIG. 2.
Figure 4:
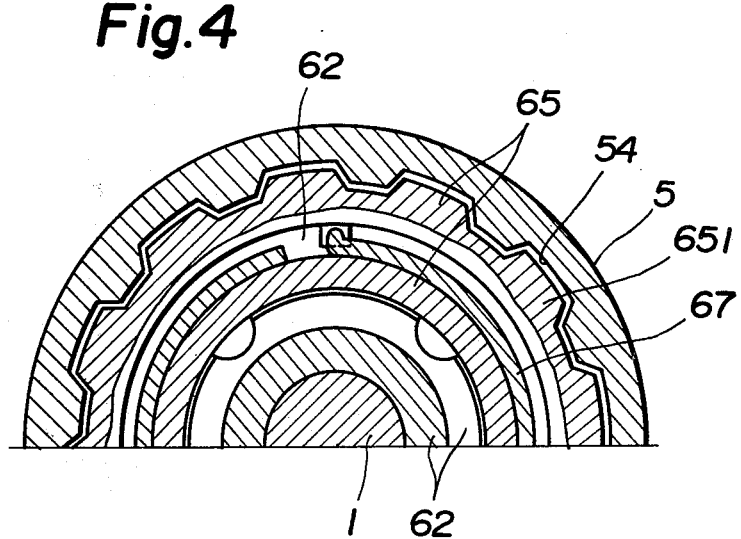
FIG. 4 is a sectional view taken on Line IV—IV in FIG. 2.

The first high and middle transmitting pawls 20, which are urged by the pawl spring 21 to be disengaged from the first inner teeth 53, slide within the windows 221 of the casing 22 when the ring gear 64 is rotated in the direction of the arrow X in FIG. 3, and then are raised by contact with the rollers 23, so that the tips of the pawls 20 mesh with the first inner teeth 53.

For middle speed the control member 7 is moved further rightwardly in FIGS. 1 and 2 to allow the engaging end portions 71 to engage the engaging teeth 641 of the ring gear 64, so that the ring gear 64 is rotatable in a rotary ratio of 1 to 1 with respect to the driving member 3. Thus the driving force is not speed-changed in being transmitted from the transmitting pawls 20 to the hub shell 5.

In this instance, the transmitting pawls 20 even being free from the first inner teeth 53 at the start as in the high speed drive, also mesh with teeth 53 simultaneously with the rotation of the ring gear 64.

For the high and middle speed drive, the driving force tends to be transmitted to the clutch ring 65 from the gear frame 62 through the clutch cone 82, but is reduced in its rotary speed to be smaller than that of the ring gear 64, i.e., the hub shell 5, thereby not being transmitted to the clutch ring 65 due to a slide caused between the clutch ring 65 and the clutch cone 82.

When the control member 7 is moved still further rightwardly, the end faces of the engaging portions 71 abut against the stepped portions 642 on the ring gear 64 so as to move the ring gear 64 rightwardly, whereby the control ring 55 restrains the pawls 20 from rising. Under the conditions, the driving force is transmitted from the driving member 3 to the control member 7 to ring gear 64, reduced in rotary speed through the planetary gears 61 and then transmitted to the hub shell through the gear frame 62, clutch cone 82, and clutch ring 65, thus driving the hub shell 5 at low speed.

In the aforesaid descriptions, the driving member 3 is, in all the cases, normally rotated to drive the hub shell 5. The braking action exerted on the bicycle in running under the aforesaid conditions is described hereinafter.

The braking action in any driving stage is carried out in such a manner that the driving member 3 is reversely rotated by back-pedaling to rotate the gear frame 62 reversely to thereby move the clutch cone 82 leftwardly in FIGS. 1 and 2.

In this instance, the ring gear 64 in any driving stage is reversely rotated at a higher speed than the gear frame 62. Hence, the first transmitting pawls 20 are in advance of the rollers 23 and are slidable within the windows 221 to disconnect from the rollers 23, thereby forcing the fall of transmitting pawls by the pawl spring 21 to inevitably disengage the transmitting pawls from the first inner teeth 53.

Accordingly, the so-called locking phenomenon such that the first transmitting pawls 20 be fixed in mesh with the first inner teeth 53, never occurs.

As seen from the aforesaid embodiment of the invention, the locking at the braking action can be eliminated and also the braking mechanism is prevented from acting when moving the bicycle backwardly.

In detail, when the bicycle is moved backwardly, the hub shell 5 acts as a driving member to transmit the reverse rotation in the direction of the arrow Y in FIG. 3 through the first transmitting pawls 20 as well as the clutch ring 65. Then, the reverse rotation of the clutch ring 65 is transmitted directly to the gear frame 62 through the clutch spring 67 to thereby accelerate the rotary speed of the ring gear 64 to be faster than that of the hub shell 5. Hence, the first transmitting pawls 20 fall down because of pawl spring 21 in the same way as in the braking action so as to disengage from the first inner teeth 53. Thus no reverse rotation is transmitted therefrom.

On the other hand, the reverse rotation transmitted from the hub shell 5 to the gear frame 62 through the clutch spring 67, allows the clutch cone 82 screwed to the gear frame 62 to screwably advance toward the brake shoes 83, but the gear frame 62 when the clutch cone 82 is contacted with the brake shoes 83, is affected with a rotation resistance more than the predetermined value. Hence, the resistance makes the clutch spring 67 slidable, so that thereafter no driving force is transmitted from the clutch ring 65 to the gear frame 62.

As a result, the clutch cone 82 is stopped in its advance immediately upon contact with the brake shoes 83, whereby the brake shoes are not radially expanded and no braking action takes place.

As clearly understood from the aforesaid description, the multi-speed transmission hub of the invention is so constituted that the transmitting pawls are urged by the pawl spring to be free from the inner teeth of the hub shell and are, only when the driving member is normally rotated, raised to be meshed with the inner teeth by use of the differential rotary speed between the gear frame and ring gear. Thus the locking previously caused by the reverse rotation of hub shell upon braking action, can be eliminated surely.

Furthermore, the hub is provided with a clutch ring always in mesh with the second inner teeth provided on the hub shell and with the clutch cone which is mounted between the clutch ring and gear frame to transmit the reverse rotation of the clutch ring to the gear frame and is slidable with the rotation resistance over the predetermined value, so that the reverse rotation of the hub shell may not be transmitted through the first transmitting pawls on the ring gear when the bicycle is moved backwardly. Hence, when moving the bicycle backwardly, no braking action occurs by actuating the clutch cone, thereby eliminating by simple construction the defect of the occurrence of braking action during the bicycle's backward movement.

While an embodiment of the invention has been described using specific terms, such description is for illustrative purpose only, and it is to be understood that changes and variations may be made without departing from the spirit or scope of the following claims.

What is claimed is:

1. A multi-speed transmission hub for a bicycle, having:
    a fixed shaft;
    a driving member rotatably supported on said fixed shaft;
    a sprocket mounted on said driving member;
    a hub shell rotatably supported with respect to said driving member;
    a multiple speed-change mechanism housed within said hub shell so as to change the speed of a driving force transmitted from said driving member to said hub shell,
        said speed-change mechanism comprising a sun gear mounted on said fixed shaft, a gear frame having planetary gears engageable with said sun gear, a ring gear having inner teeth engageable with said planetary gears, and a clutch cone screwable with said gear frame;
    a control member between said driving member and said gear frame for relaying to said speed-change mechanism the driving force transmitted from said driving member;
    and a braking mechanism acting to stop the rotation of said hub shell when said driving member is reversely rotated,
        said braking mechanism comprising brake shoes actuated by said clutch cone, and a brake cone for stopping the rotation of said brake shoes;
        said hub being provided with first and second inner teeth provided at the inner surface of said hub shell and first transmitting members and a second transmitting member, engageable with said first and second inner teeth respectively, said first and second transmitting members transmitting the driving force from said speed-change mechanism to said hub shell, said first transmitting members comprising transmitting pawls urged by a pawl spring in the direction of disengagement from said first inner teeth, said first transmitting members being adapted to be engaged with said first inner teeth by use of differential rotary speed between said gear frame and ring gear when said driving member is normally rotated.

2. The multi-speed transmission hub for a bicycle according to claim 1, including a control mechanism on said gear frame wherein said ring gear has through holes accommodating therein the first transmitting members of pawls, said control mechanism controlling said first transmitting members being inserted throughout said through holes and abutting on the inner surfaces resiliently against said gear frame by means of said pawl spring, said ring gear being rotatable faster than said gear frame allows said first transmitting members to be rotated with respect to said gear frame when said driving member is normally rotated, so that said control mechanism may raise said first transmitting members to engage with said first inner teeth respectively.

3. The multi-speed transmission hub for a bicycle according to claim 2, wherein said control mechanism comprises a cylindrical casing and a clutch spring, said casing having as many cutout windows as said first transmitting members, said cutout windows being capable of accommodating therein said first transmitting members, said clutch spring applying to said gear frame the resistance overcoming the strength necessary for raising the first transmitting members when said driving member is normally rotated, so that said gear frame may be rotated under said resistance.

4. The multi-speed transmission hub for a bicycle according to claim 3, wherein said cutout windows of the cylindrical casing carry therewith rollers which are in contact with said first transmitting members respectively.

5. The multi-speed transmission hub for a bicycle according to claim 1 including a clutch means, wherein said second transmitting member is formed in a ring-like shape and has at the outer periphery teeth always engageable with said second inner teeth of the hub shell and at the inner periphery a face in contact with the outer periphery of said clutch cone, said clutch means, being between said second transmitting member and said gear frame, transmits the reverse rotation of the hub shell to said gear frame and is slidable under a resistance more than the predetermined value, when said hub shell is reversely rotated.

* * * * *